(12) United States Patent
Nair et al.

(10) Patent No.: US 12,407,740 B2
(45) Date of Patent: Sep. 2, 2025

(54) IMS AND VOICE SERVICES SIMPLIFICATION IN CELLULAR NETWORKS OVER PUBLIC CLOUD

(71) Applicant: DISH WIRELESS L.L.C., Englewood, CO (US)

(72) Inventors: Sruthi Nair, Aurora, CO (US); Mohammad Dawood Shahdad, Aurora, CO (US); Krupalkumar Patel, Aurora, CO (US); Jaya Chandra Chikatmarla, Aurora, CO (US); Kumar Anshuman, Aurora, CO (US)

(73) Assignee: DISH Wireless L.L.C., Englewood, CO (US)

( * ) Notice: Subject to any disclaimer, the term of this patent is extended or adjusted under 35 U.S.C. 154(b) by 215 days.

(21) Appl. No.: 18/134,769

(22) Filed: Apr. 14, 2023

(65) Prior Publication Data

US 2024/0348666 A1    Oct. 17, 2024

(51) Int. Cl.
*H04L 65/1016* (2022.01)
*H04L 61/5007* (2022.01)
(Continued)

(52) U.S. Cl.
CPC ...... *H04L 65/1016* (2013.01); *H04L 65/1033* (2013.01); *H04L 65/1046* (2013.01); *H04L 65/1063* (2013.01); *H04L 65/1106* (2022.05); *H04L 67/02* (2013.01); *H04L 67/10* (2013.01); *H04L 61/5007* (2022.05)

(58) Field of Classification Search
CPC ............. H04L 65/1016; H04L 65/1106; H04L 61/5007; H04L 65/1033; H04L 65/1046; H04L 65/1063; H04L 67/02; H04L 67/10
See application file for complete search history.

(56) References Cited

U.S. PATENT DOCUMENTS

2019/0327135 A1*  10/2019  Johnson ............. H04L 41/0803
2021/0166171 A1*   6/2021  Jobér ................. G06Q 10/0637
(Continued)

FOREIGN PATENT DOCUMENTS

WO    2021/205212 A1    10/2021

OTHER PUBLICATIONS

Jouin, "Network Service Mesh Solving Cloud Native IMS Networking Needs.", Jul. 2020, 72 pages, Uppsala Universitet. (Year: 2020).*

(Continued)

*Primary Examiner* — Brian J. Gillis
*Assistant Examiner* — Chhian (Amy) Ling
(74) *Attorney, Agent, or Firm* — Kipman T. Werking; Frontier IP Law PLLC

(57) ABSTRACT

A disclosed method may include (i) establishing an Internet Protocol Multimedia Subsystem instance, (ii) aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address, and (iii) directing outbound communications from the multiple distinct cloud native functions associated with the Internet Protocol Multimedia Subsystem instance through the single Internet Protocol address. Various other systems and computer-readable mediums are further disclosed.

20 Claims, 8 Drawing Sheets

(51) Int. Cl.
      *H04L 65/1033*    (2022.01)
      *H04L 65/1046*    (2022.01)
      *H04L 65/1063*    (2022.01)
      *H04L 65/1106*    (2022.01)
      *H04L 67/02*    (2022.01)
      *H04L 67/10*    (2022.01)

(56) References Cited

U.S. PATENT DOCUMENTS

| | | | |
|---|---|---|---|
| 2022/0263789 A1 | 8/2022 | King et al. | |
| 2023/0050998 A1* | 2/2023 | Kita | H04L 41/5006 |
| 2024/0195504 A1* | 6/2024 | Nagesh | H04B 10/27 |

OTHER PUBLICATIONS

International Search Report and Written Opinion received for PCT Patent Application No. PCT/US24/20458, mailed on May 23, 2024, 9 pages.

* cited by examiner

700

Cloud Computing Instances Required:

| Cloud Computing Instance Type | Related #Cloud Instances for 600k Subscribers | Improved #Cloud Instances for 600k Subscribers |
|---|---|---|
| M5.16XLarge | 25 | 7 |

736 — (table)
730 — Cloud Computing Instance Type
732 — Related #Cloud Instances for 600k Subscribers
734 — Improved #Cloud Instances for 600k Subscribers

*FIG. 7*

IMS AND VOICE SERVICES SIMPLIFICATION IN CELLULAR NETWORKS OVER PUBLIC CLOUD

BRIEF SUMMARY

The present disclosure is generally directed to cloud native function simplification, as discussed in more detail below. In some examples, a method may include (i) establishing an Internet Protocol Multimedia Subsystem instance, (ii) aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address, and (iii) directing outbound communications from the multiple distinct cloud native functions associated with the Internet Protocol Multimedia Subsystem instance through the single Internet Protocol address.

In some examples, the multiple distinct cloud native functions of the Internet Protocol Multimedia Subsystem instance are aggregated within a single physical computing server box.

In some examples, all cloud native functions of the Internet Protocol Multimedia Subsystem instance are aggregated within the single physical computing server box.

In some examples, the multiple distinct cloud native functions are effectively integrated as a single cloud native function executing as a process.

In some examples, aggregating, within the Internet Protocol Multimedia Subsystem instance, the multiple distinct cloud native functions enables each respective component of the multiple distinct cloud native functions to communicate over a common network port.

In some examples, the multiple distinct cloud native functions comprise at least one of a breakout gateway control function, a media gateway control function, or a call session control function.

In some examples, the call session control function comprises at least one of an interrogating-call session control function, a proxy-call session control function, or a serving-call session control function.

In some examples, prior to the aggregating, each of the multiple distinct cloud native functions is assigned a respective coordinate Internet Protocol address.

In some examples, the Internet Protocol Multimedia Subsystem instance comprises an access subcomponent, a core subcomponent, and an application subcomponent.

In some examples, aggregating, within the Internet Protocol Multimedia Subsystem instance, the multiple distinct cloud native functions effectively reduces a number of at least one of servers, memory costs, disks, or central processing unit utilizations.

In some examples, a system may include at least one physical processor and a non-transitory computer-readable medium encoding instructions that, when executed by the at least one physical processor, cause operations to be performed comprising (i) establishing an Internet Protocol Multimedia Subsystem instance, (ii) aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address, and (iii) directing outbound communications from the multiple distinct cloud native functions associated with the Internet Protocol Multimedia Subsystem instance through the single Internet Protocol address.

In some examples, a non-transitory computer-readable medium can encode instructions that, when executed by at least one physical processor of a computing device, cause the computing device to perform operations comprising (i) establishing an Internet Protocol Multimedia Subsystem instance, (ii) aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address, and (iii) directing outbound communications from the multiple distinct cloud native functions associated with the Internet Protocol Multimedia Subsystem instance through the single Internet Protocol address.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 7 shows an additional table of improved performance metrics resulting from cloud native function simplification.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
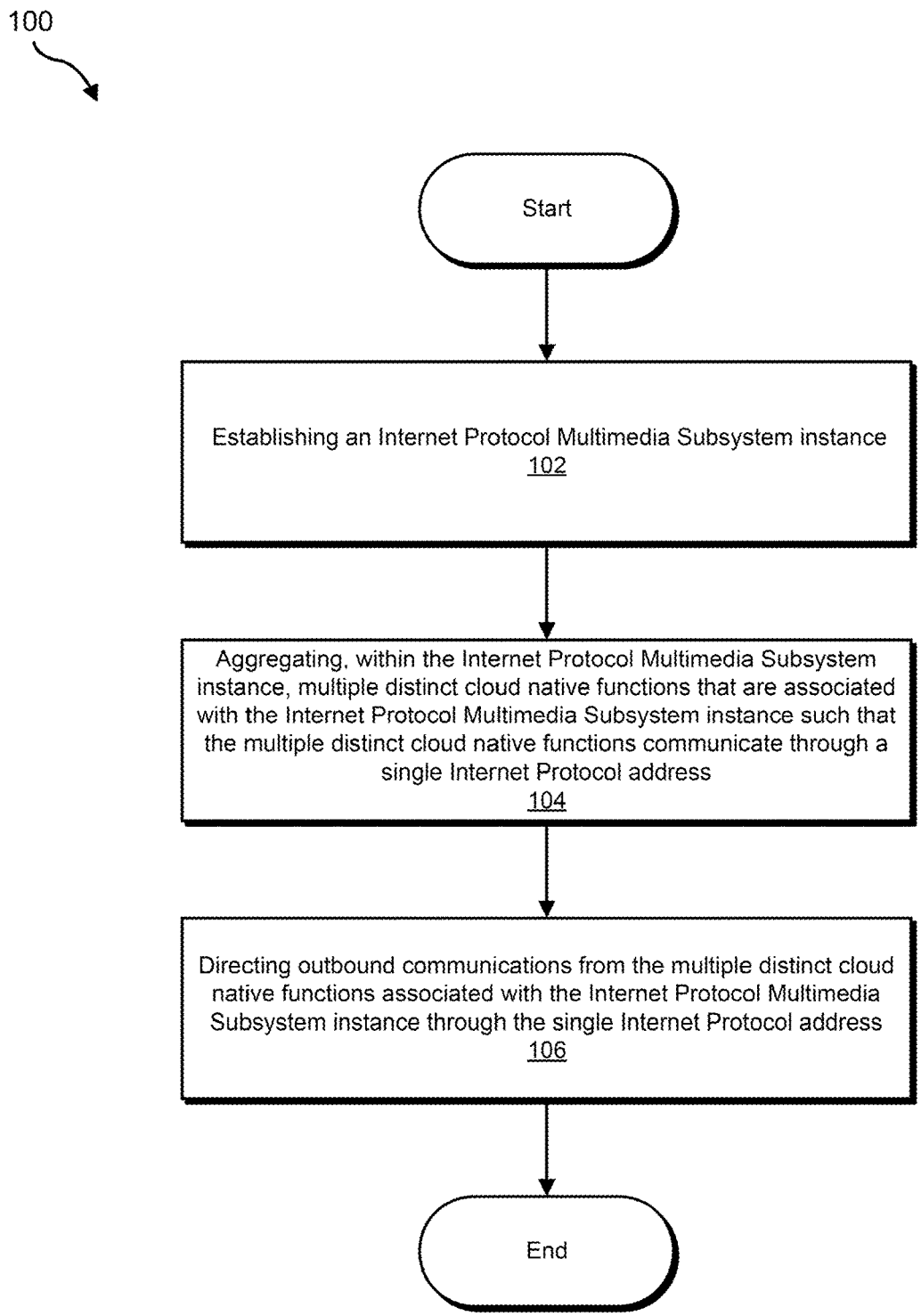
FIG. 1 shows a flow diagram for an example method for cloud native function simplification.

FIG. 1 shows a flow diagram for an example method 100 for cloud native function simplification. At step 102, one or more of the systems described herein may establish an Internet Protocol Multimedia Subsystem instance. At step 104, one or more of the systems described herein may aggregate, within the Internet Protocol Multimedia Subsystem instance, multiple distinct cloud native functions that are associated with the Internet Protocol Multimedia Subsystem instance such that the multiple distinct cloud native functions communicate through a single Internet Protocol address. Lastly, at step 106, one or more of the systems described herein may direct outbound communications from the multiple distinct cloud native functions associated with the Internet Protocol Multimedia Subsystem instance through the single Internet Protocol address. In some examples, steps 102 and 104 can be performed concurrently as an integrated step. Moreover, those having skill in the art will understand that, at step 106, inbound communications may be received at the single Internet Protocol address and not just outbound communications transmitted through the single Internet Protocol address. Additional details of method 100 and/or discussions of various embodiments thereof will be provided below in connection with FIGS. 2-7.

The technology of this application generally relates to the Internet Protocol ("IP") Multimedia Subsystem ("IMS"). By way of background, the Internet Protocol Multimedia Subsystem can refer to protocols and/or architectures used in telecommunications networks to ensure the provisioning of multimedia content over Internet Protocol networks. The Internet Protocol Multimedia Subsystem can establish a helpful framework for combining audio, video, and/or Internet services over IP-based networks, such as the Internet.

The Internet Protocol Multimedia Subsystem is based on the Session Initiation Protocol (SIP), which can be referenced to start, alter, and/or conclude multimedia sessions. The Internet Protocol Multimedia Subsystem can also reference or utilize distinct and additional protocols, such as the Real-time Transport Protocol (RTP), to transmit voice or video streams, as well as the Simple Network Management Protocol (SNMP). One significant improvement that is associated with the Internet Protocol Multimedia Subsystem of IMS is the establishment of interoperability between distinct services or networks, thereby permitting users to access multimedia services in different geographic regions or using different devices. This interoperability can be accomplished through an architecture that effectively separates certain services from the hardware infrastructure on which those services execute.

The Internet Protocol Multimedia Subsystem can include several different components, as discussed further below. The call session control function (CSCF) can manage the controlling of multimedia sessions, including establishment of calls, appropriate routing of calls, and the conclusion of these calls. The home subscriber server (HSS) can maintain information regarding user accounts and/or authentication credentials, thereby permitting users to interact with multimedia content with a level of security. The media resource function (MRF) can enable the processing of media, including mixing or transcoding operations, thereby increasing the quality of corresponding services. The application servers (AS) can provide the underlying logic for various services associated with multimedia content, including voice over IP (VoIP), video conferencing, and/or instant messaging. In addition to the components outlined above, the Internet Protocol Multimedia Subsystem can support one or more Quality of Service (QoS) mechanisms that allow administrators to establish policies for managing or prioritizing network traffic, which can help to guarantee that the provisioning of multimedia content is performed in a manner that satisfies certain predefined quality control metrics.

Figure 2:
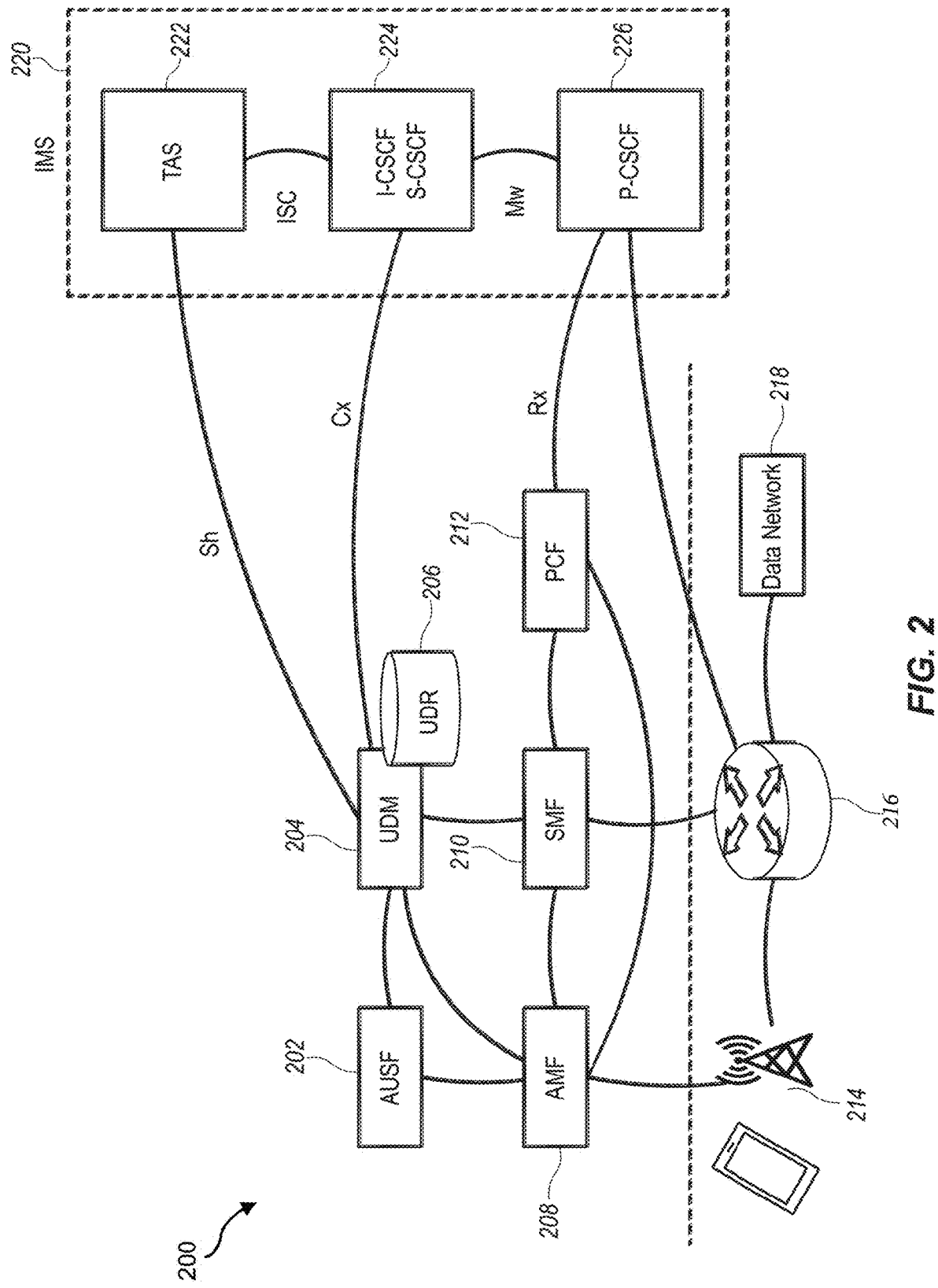
FIG. 2 shows a diagram of an Internet Protocol Multimedia Subsystem configuration in the context of a 5G cellular network.

FIG. 2 shows a diagram 200 that helps to illustrate the configuration of an Internet Protocol Multimedia Subsystem instance 220 in the context of a 5G network. As further shown in this figure, Internet Protocol Multimedia Subsystem instance 220 may further include a telephony application server 222, an interrogating call session control function and/or serving-call session control function 224, as well as a proxy-call session control function 226. As further shown in this figure, these components of Internet Protocol Multimedia Subsystem instance 220 are connected to a data network 218, one or more routers 216, and one or more instances of user equipment associated with a corresponding radio access network 214. These components are also further connected to various 5G network components, including an access and mobility management function 208, a session management function 210, a policy control function 212, a unified data repository 206, a unified data management component 204, and an authentication server function 202.

Figure 3:
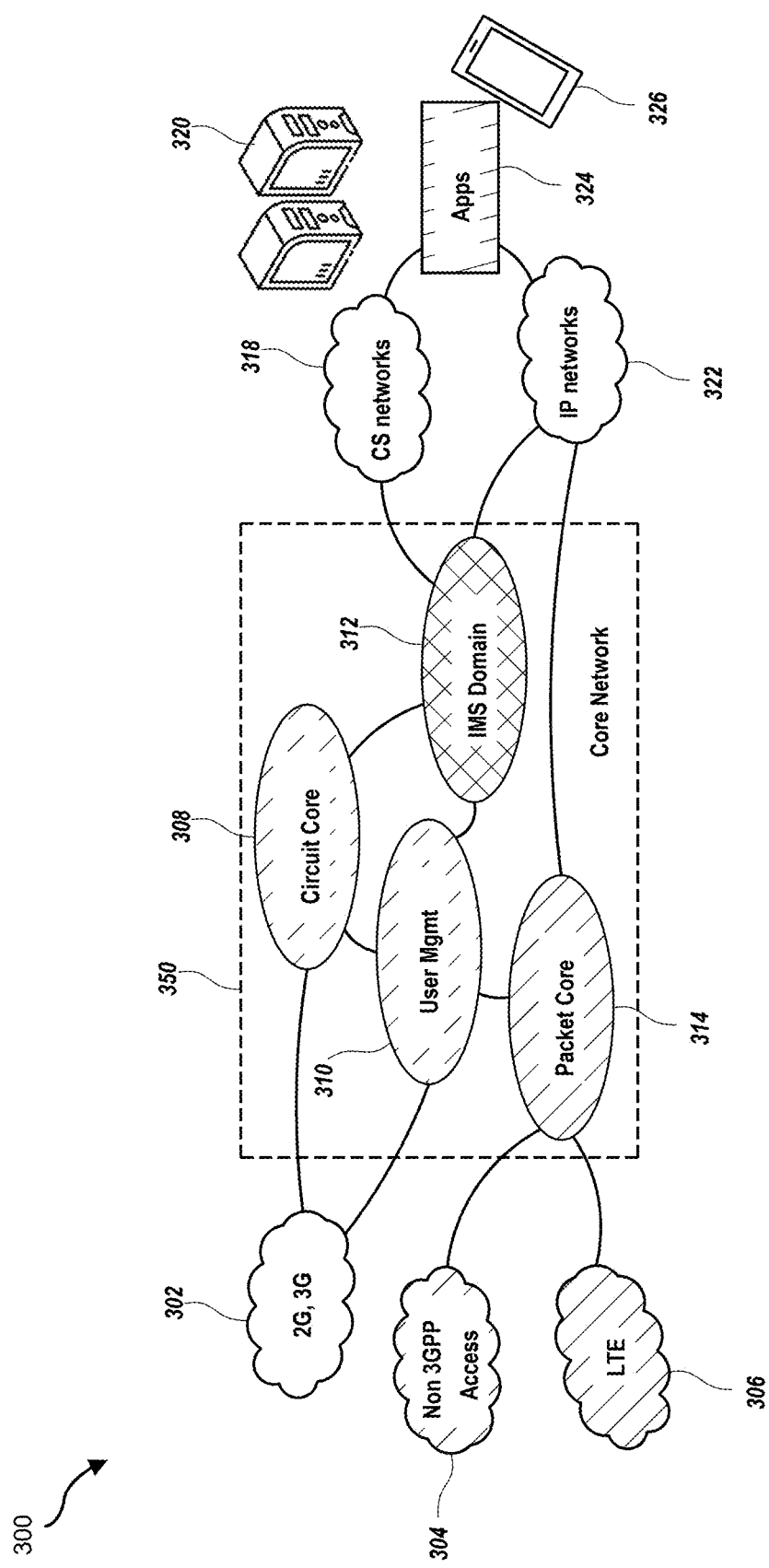
FIG. 3 shows another diagram of an Internet Protocol Multimedia Subsystem configuration in the context of 3G or 4G cellular networks.

Although some examples of the technology outlined herein apply in the context of a 5G network, the Internet Protocol Multimedia Subsystem can also be configured in connection with other networks, as discussed below in the context of FIG. 3. For completeness, and by way of background, FIG. 3 shows a diagram 300 that further indicates how an Internet Protocol Multimedia Subsystem instance can be configured in the context of 2G, 3G, and/or LTE networks. As further shown in this figure, diagram 302 can include a 2G and/or 3G cellular network, one or more networks 304 associated with non-3GPP access, and/or an LTE network 306. These networks may be connected to one or more further components associated with the Internet Protocol Multimedia Subsystem, including a user management component 310, a packet core 314, a circuit core 308, and an Internet Protocol Multimedia Subsystem domain 312, which together may form a core network 350. Lastly, the various components associated with the Internet Protocol Multimedia Subsystem may be further connected to one or more external components, including circuit switched networks 318, and Internet Protocol networks 322, applications 324, and one or more instances of user equipment, such as a smartphone 326 and/or desktop computers 320.

Figure 4:
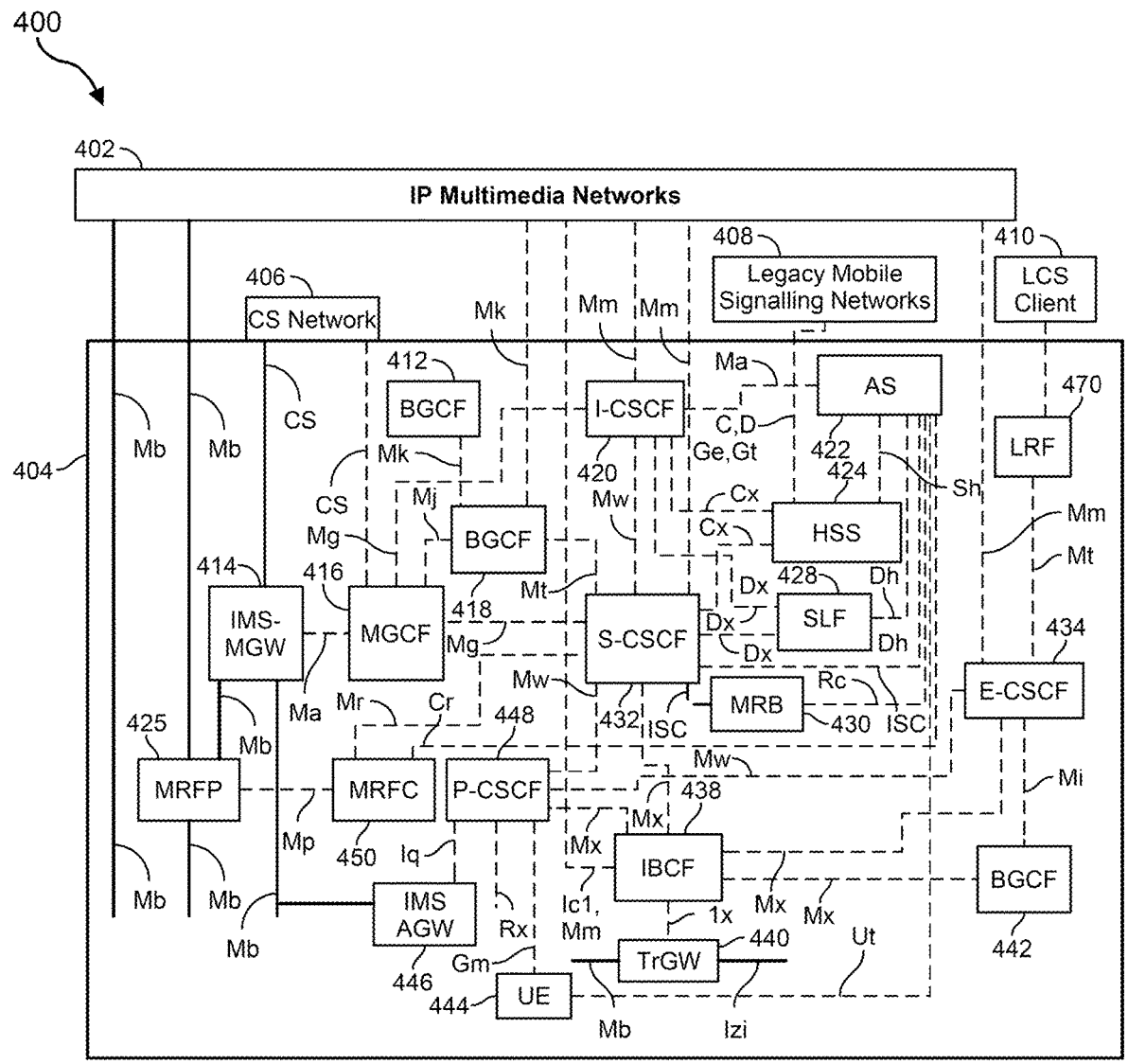
FIG. 4 shows a diagram of an Internet Protocol Multimedia Subsystem instance and its various subcomponents.

In various embodiments, the technology of this application may simplify, integrate, aggregate, and/or otherwise streamline two or more segregated cloud native functions operating as part of an Internet Protocol Multimedia Subsystem instance 404. FIG. 4 shows a diagram 400 that further illustrates, in detail, the various different cloud native functions executed and/or operated by Internet Protocol Multimedia Subsystem instance 404. As further shown in this figure, diagram 400 may further include Internet Protocol multimedia networks 402, circuit switched network 406, legacy mobile signaling networks 408, and location services client 410. Moreover, Internet Protocol Multimedia Subsystem 404 may further include the following subcomponents, which may each correspond to a separate cloud native function:

multimedia resource function processor 425
internet multimedia subsystem-media gateway function 414
internet multimedia subsystem-access gateway 446
multimedia resource function controller 450
media gateway control function 416
user equipment 444
proxy-call session control function 448,
breakout gateway control functions 418, 412, and 442
transition gateway 440
interconnection border control function 438
serving call session control function 432. interrogating call session control function 420
media resource broker 430
subscription locator function 428
home subscriber server 424
application server(s) 422
location retrieval function 470
emergency-call session control function 434

The above list of components, servers, and/or cloud native functions associated with the Internet Protocol Multimedia Subsystem is merely illustrative and, in other examples, one or more additional cloud native functions may be aggregated in accordance with method 100, as discussed further below. In some examples, one or more of these various cloud native functions may belong to, or be associated with, a cloud native communication suite (CNCS).

In related frameworks, each one of the different cloud native functions listed above might be configured as its own separate physical server, with its own physical computing server box, with its own Internet Protocol address and communicating on a corresponding network port. Nevertheless, the usage of a multitude of different Internet Protocol addresses can become cumbersome, inefficient, and/or otherwise undesirable. Accordingly, consistent with method 100, this application discloses technology that may effectively integrate, aggregate, and/or streamline any suitable two or more of these cloud native functions together (e.g., any suitable permutation of the subcomponents shown within diagram 400) such that the different functionalities associated with these cloud native functions effectively operate as a single cloud native function. In these examples, multiple distinct cloud native functions, or even all cloud native functions of the Internet Protocol Multimedia Subsystem, may be aggregated within a single physical computing server box. Moreover, in these examples, prior to the aggregating of method 100, each of the multiple distinct cloud native functions was assigned a respective coordinate Internet Protocol address, whereas after the aggregating process of method 100, multiple distinct cloud native functions may effectively communicate through a single Internet Protocol address, thereby streamlining or simplifying communication. In contrast, prior to the aggregating, each of the multiple distinct cloud native functions were generally assigned a respective coordinate Internet Protocol address, resulting in a multitude of Internet Protocol addresses being used and managed, which can become costly and cumbersome.

Figure 5:
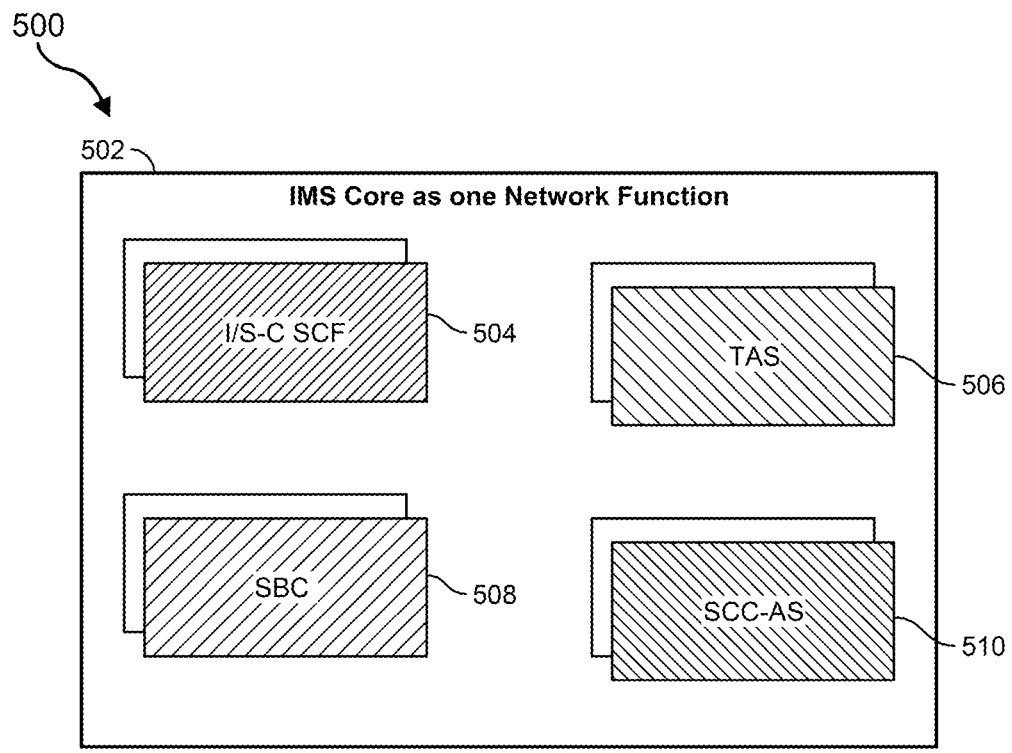
FIG. 5 shows a diagram of a version of the Internet Protocol Multimedia Subsystem instance using cloud native function simplification.

FIG. 5 shows a diagram 500 that further includes an Internet Protocol Multimedia Subsystem Core 502, in which multiple different cloud native functions (e.g., one or more permutations of the cloud native functions outlined above with respect to diagram 400) have been aggregated into one or more of at least four separate categories. In particular, diagram 500 further illustrates how multiple different cloud native functions can be aggregated into one or more of an interrogating/serving call session control function 504, a telephony application server 506, a session border controller 508, and/or a service centralization and continuity application server 510. In some examples, various permutations of cloud native functions of the IMS can be aggregated into an aggregated cloud native function for interrogating/serving call session control function 504, telephony application server 506, session border controller 508, and/or service centralization and continuity application server 510, respectively (i.e. reducing a number of cloud native functions to four). Alternatively, the various cloud native functions may simply be organized according to the four categories shown within diagram 500, while nevertheless the entirety of all these cloud native functions can be effectively aggregated into a single cloud native function for the entirety of the Internet Protocol Multimedia Subsystem instance. In other words, in some examples, multiple distinct cloud native functions are effectively integrated as a single cloud native function executing as a process. Moreover, in further examples, performing method 100 enables each respective component of the multiple distinct cloud native functions to communicate over a common network port, rather than communicating over distinct and separate network ports (as in the related methodology prior to the improvement of method 100).

Figure 6:
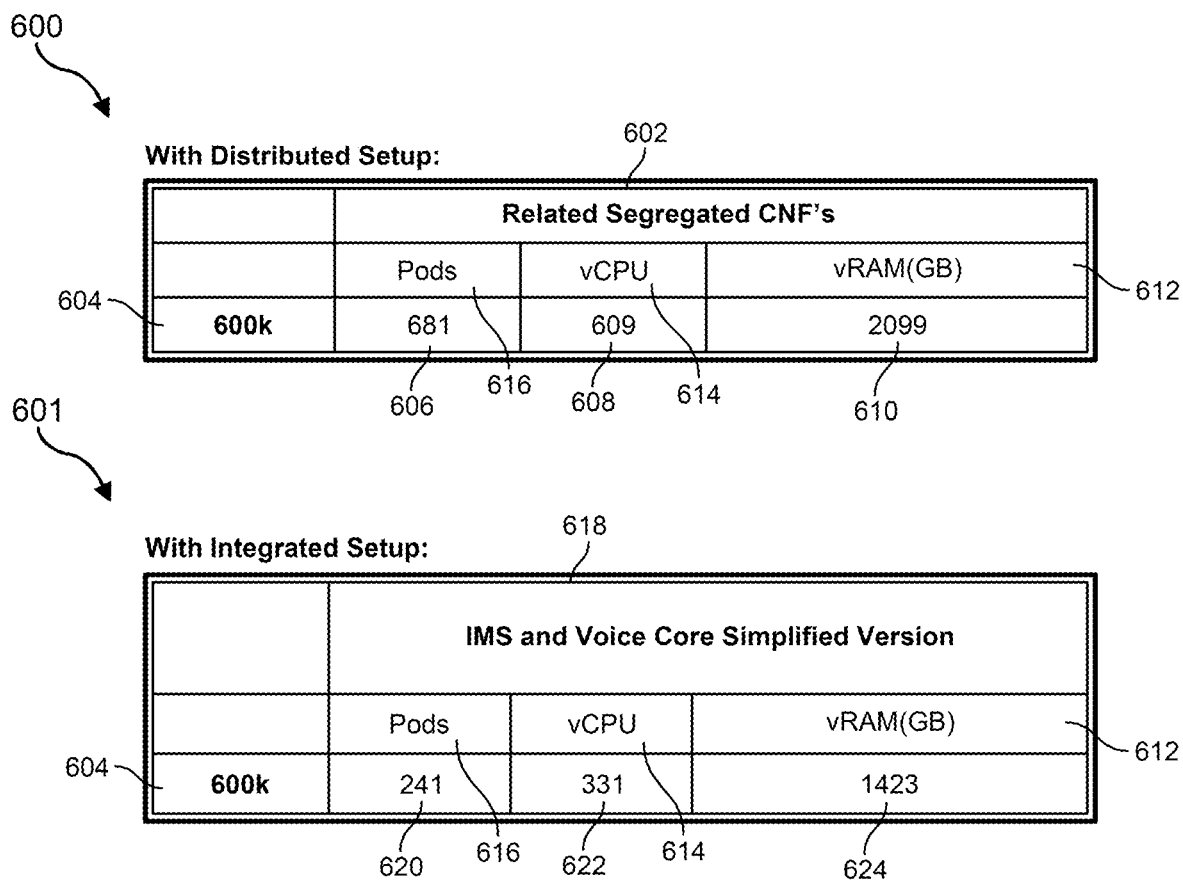
FIG. 6 shows two tables illustrating improved performance metrics resulting from cloud native function simplification.

FIGS. 6-7 show a table 600, a table 601, and a table 700, respectively, which further help to highlight the improved performance metrics and other benefits associated with the performance of method 100. As further shown in FIG. 6, table 600 may correspond to a related configuration in which cloud native functions remain segregated and, therefore, do not result in the performance benefits associated with method 100, as indicated by a headline 602. Table 600 may be contrasted with table 601, which corresponds to a configuration in which the Internet Multimedia Subsystem and voice core components have been simplified consistent with method 100, as indicated by a headline 618. In this illustrative example, the values shown in these tables correspond to scenarios involving 600,000 subscribers, as indicated by two respective instances of indicator 604.

The various performance metrics include a number of pods, a number of virtual central processing units, and an amount of virtual random access memory, as indicated by cells 616, 614, and 612, respectively. As further shown in FIG. 6, the number of pods, virtual central processing units, and virtual random access memory (in GB) for table 600 are 681 (cell 606), 609 (cell 608), and 2099 (cell 610), whereas the same corresponding values for table 601 are 241 (cell 620), 331 (cell 622), and 1423 (cell 624). Accordingly, contrasting table 601, which shows the benefits of the performance of method 100, with table 600, shows that performing method 100 significantly reduces each of these values and, therefore, further reduces the corresponding costs, delays, hassles, inconveniences, and/or resource consumption associated with these values.

Table 700 in FIG. 7 similarly outlines, through contrast, the performance benefits associated with method 100. As further shown in this figure, for one illustrative example of a cloud computing instance type ("M5.16XLarge" in this example, as indicated by indicators 736 and 730), a number of such instances has been reduced from 25 according to the related or non-improved methodology in which cloud native functions remain segregated (see cell 732) to just seven according to the improved methodology of method 100 (see cell 734). More generally, the aggregating step of method 100 can effectively reduce a number of at least one of servers, memory costs, disks, or central processing unit utilizations.

Reducing the number of instances of a cloud computing platform when establishing a telecommunications server can provide a range of benefits. Firstly, it can help to optimize the overall performance of the system. When a large number of instances are running, it can cause the system to become overloaded and result in slower processing times. By reducing the number of instances, the server can allocate resources more effectively and efficiently, ensuring that it can handle requests faster and more reliably. Secondly, reducing the number of instances can lead to cost savings. Cloud computing platforms typically charge based on the number of instances running, so reducing the number of instances can significantly reduce the overall cost of running the server. This is particularly helpful for telecommunications servers, which can require a large number of instances to handle high volumes of traffic. Thirdly, reducing the number of instances can improve the overall security of the system. When a large number of instances are running, it can be more difficult to monitor and manage them effectively. By reducing the number of instances, it becomes easier to keep track of any security issues or vulnerabilities and address them more quickly. Finally, reducing the number of instances can also make it easier to manage the server overall. With fewer instances, there are fewer moving parts to keep track of, which can simplify the process of deploying updates, managing backups, and addressing any other issues that may arise.

Figure 8:
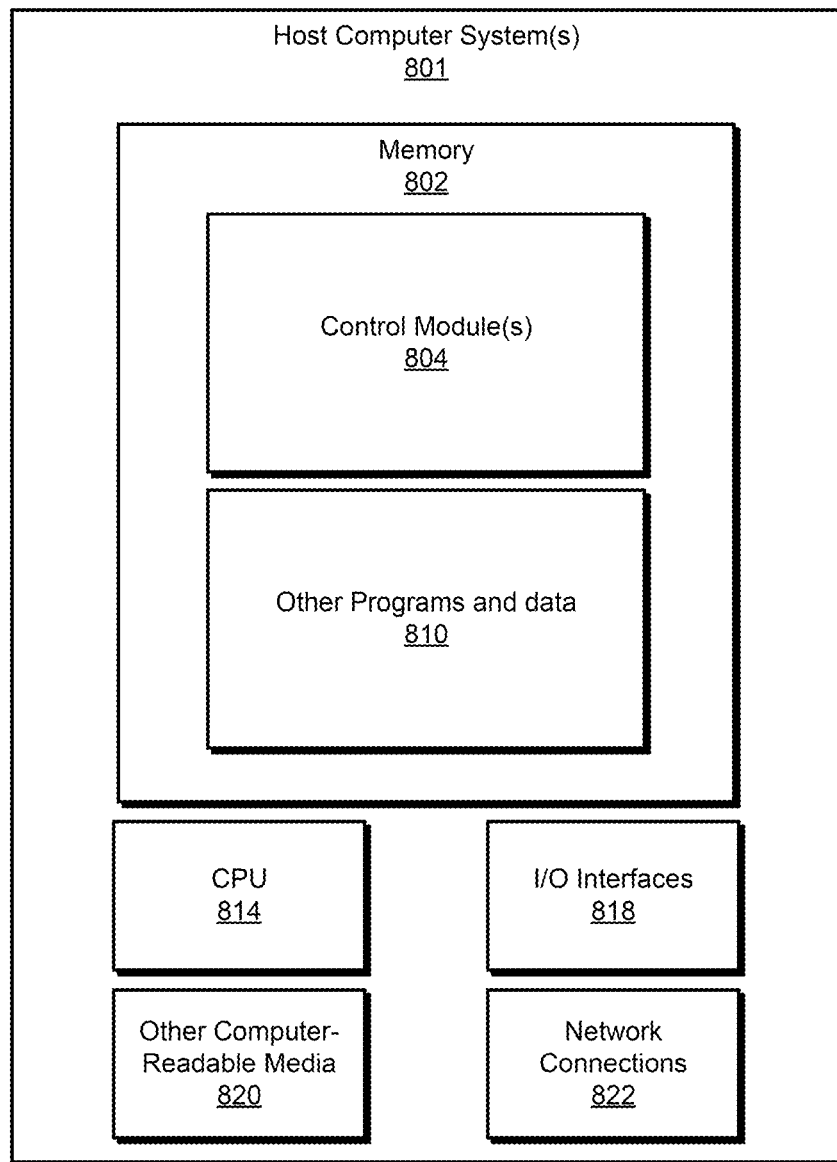
FIG. 8 shows an example computing system that may facilitate the performance of one or more of the methods described herein.

FIG. 8 shows a system diagram that describes an example implementation of a computer system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computer system(s) 801. For example, such host computer system(s) 801 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof.

Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems or components described herein. Memory 802 may also store other programs and data 810, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, cloud native functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   establishing an Internet Protocol Multimedia Subsystem instance;
   aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address; and
   directing outbound communications from the multiple distinct cloud native functions associated with the Internet Protocol Multimedia Subsystem instance through the single Internet Protocol address;

wherein:

the multiple distinct cloud native functions are effectively integrated as a single cloud native function executing as a process.

2. The method of claim 1, wherein the multiple distinct cloud native functions of the Internet Protocol Multimedia Subsystem instance are aggregated within a single physical computing server box.

3. The method of claim 2, wherein all cloud native functions of the Internet Protocol Multimedia Subsystem instance are aggregated within the single physical computing server box.

4. The method of claim 1, wherein aggregating, within the Internet Protocol Multimedia Subsystem instance, the multiple distinct cloud native functions effectively reduces a number of cloud computing instances.

5. The method of claim 1, wherein aggregating, within the Internet Protocol Multimedia Subsystem instance, the multiple distinct cloud native functions enables each respective component of the multiple distinct cloud native functions to communicate over a common network port.

6. The method of claim 1, wherein, prior to the aggregating, each of the multiple distinct cloud native functions is assigned a respective coordinate Internet Protocol address.

7. The method of claim 1, wherein the multiple distinct cloud native functions comprise at least one of a breakout gateway control function, a media gateway control function, or a call session control function.

8. The method of claim 7, wherein the call session control function comprises at least one of an interrogating-call session control function, a proxy-call session control function, or a serving-call session control function.

9. The method of claim 1, wherein the Internet Protocol Multimedia Subsystem instance comprises an access subcomponent, a core subcomponent, and an application subcomponent.

10. The method of claim 1, wherein aggregating, within the Internet Protocol Multimedia Subsystem instance, the multiple distinct cloud native functions effectively reduces a number of at least one of servers, memory costs, disks, or central processing unit utilizations.

11. A system comprising:

at least one physical processor; and a non-transitory computer-readable medium encoding instructions that, when executed by the at least one physical processor, cause operations to be performed comprising:

establishing an Internet Protocol Multimedia Subsystem instance;

aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address; and directing outbound communications from the multiple distinct cloud native functions associated with the Internet Protocol Multimedia Subsystem instance through the single Internet Protocol address;

wherein:

the multiple distinct cloud native functions are effectively integrated as a single cloud native function executing as a process.

12. The system of claim 11, wherein the multiple distinct cloud native functions of the Internet Protocol Multimedia Subsystem instance are aggregated within a single physical computing server box.

13. The system of claim 12, wherein all cloud native functions of the Internet Protocol Multimedia Subsystem instance are aggregated within the single physical computing server box.

14. The system of claim 11, wherein aggregating, within the Internet Protocol Multimedia Subsystem instance, the multiple distinct cloud native functions effectively reduces a number of cloud computing instances.

15. The system of claim 11, wherein aggregating, within the Internet Protocol Multimedia Subsystem instance, the multiple distinct cloud native functions enables each respective component of the multiple distinct cloud native functions to communicate over a common network port.

16. The system of claim 11, wherein, prior to the aggregating, each of the multiple distinct cloud native functions is assigned a respective coordinate Internet Protocol address.

17. The system of claim 11, wherein the multiple distinct cloud native functions comprise at least one of a breakout gateway control function, a media gateway control function, or a call session control function.

18. The system of claim 17, wherein the call session control function comprises at least one of an interrogating-call session control function, a proxy-call session control function, or a serving-call session control function.

19. The system of claim 11, wherein the Internet Protocol Multimedia Subsystem instance comprises an access subcomponent, a core subcomponent, and an application subcomponent.

20. A non-transitory computer-readable medium encoding instructions that, when executed by at least one physical processor of a computing device, cause the computing device to perform operations comprising:

establishing an Internet Protocol Multimedia Subsystem instance;

aggregating, within the Internet Protocol Multimedia Subsystem instance, multiple distinct cloud native functions that are associated with the Internet Protocol Multimedia Subsystem instance such that the multiple distinct cloud native functions communicate through a single Internet Protocol address; and directing outbound communications from the multiple distinct cloud native functions associated with the Internet Protocol Multimedia Subsystem instance through the single Internet Protocol address;

wherein:

the multiple distinct cloud native functions are effectively integrated as a single cloud native function executing as a process.

\* \* \* \* \*